US012036985B2

(12) United States Patent
Choi (10) Patent No.: US 12,036,985 B2
(45) Date of Patent: Jul. 16, 2024

(54) METHOD AND SYSTEM FOR COMPENSATING ROAD LINE

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 170 days.

(21) Appl. No.: 17/517,896

(22) Filed: Nov. 3, 2021

(65) Prior Publication Data
US 2022/0194369 A1    Jun. 23, 2022

(30) Foreign Application Priority Data

Dec. 18, 2020   (KR) .................. 10-2020-0178258

(51) Int. Cl.
*B60W 30/12*   (2020.01)
*B60W 40/072*   (2012.01)
*B60W 50/14*   (2020.01)
*G01D 5/244*   (2006.01)

(52) U.S. Cl.
CPC .......... *B60W 30/12* (2013.01); *B60W 40/072* (2013.01); *B60W 50/14* (2013.01); *G01D 5/24476* (2013.01); *G01D 5/2448* (2013.01); *B60Y 2300/12* (2013.01)

(58) Field of Classification Search
CPC .... B60W 30/12; B60W 40/072; B60W 50/14; G01D 5/24476; G01D 5/2448
See application file for complete search history.

(56) References Cited

U.S. PATENT DOCUMENTS

| 5,612,686 A * | 3/1997 | Takano | G05D 1/0246 |
| | | | 348/148 |
| 9,031,787 B2 * | 5/2015 | Kondo | G01C 21/3658 |
| | | | 348/148 |
| 11,068,735 B2 * | 7/2021 | Okada | G06T 7/50 |

FOREIGN PATENT DOCUMENTS

KR   10-2013-0051375 A    5/2013

* cited by examiner

*Primary Examiner* — Khoi H Tran
*Assistant Examiner* — Bryant Tang
(74) *Attorney, Agent, or Firm* — NSIP Law (57) ABSTRACT

A method for compensating a road line includes deriving a length of a left road line and a length of a right road line, recognized by a sensor, and determining a left road line level and a right road line level based on the length of the left road line and the length of the right road line; correcting the left road line level and the right road line level based on a change in the lengths of the left road line and the right road line or a change in curvatures of the left road line and the right road line; calculating a correction coefficient based on the corrected left road line level and the corrected right road line level; and correcting, by the correction coefficient, information about a road line with a lower level of the corrected left road line level and the corrected right road line level.

12 Claims, 6 Drawing Sheets

METHOD AND SYSTEM FOR COMPENSATING ROAD LINE

CROSS-REFERENCE TO RELATED APPLICATION

The present application claims priority to Korean Patent Application No. 10-2020-0178258, filed Dec. 18, 2020, the entire contents of which is incorporated herein for all purposes by this reference.

BACKGROUND OF THE INVENTION

1. Field of the Invention

The present invention relates to a method and a system for compensating road line information.

2. Description of the Related Art

An advanced driving assistance system (ADAS) is a system for assisting driving of a driver. The ADAS senses situations around a vehicle by the sensor and determines the surroundings on the basis of the sensed result to control movement of the vehicle.

The ADAS may control the vehicle movement by recognizing a line on a road. When inaccurate information is sensed due to erased road lines or tire marks, the ADAS may malfunction.

Conventionally, the ADAS derives, by a sensor, view ranges of left and right road lines to each other in a comparative manner, determines an effective road line, and corrects information of an ineffective road line on the basis of the effective road line information.

The foregoing is intended merely to aid in the understanding of the background of the present invention, and is not intended to mean that the present invention falls within the purview of the related art that is already known to those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method for compensating road line information includes: deriving a length of a left road line and a length of a right road line, recognized by a sensor, and determining a left road line level and a right road line level based on the length of the left road line and the length of the right road line; correcting the left road line level and the right road line level based on a change in the lengths of the left road line and the right road line or a change in curvatures of the left road line and the right road line; calculating a correction coefficient based on the corrected left road line level and the corrected right road line level; and correcting, by the correction coefficient, information about a road line with a lower level of the corrected left road line level and the corrected right road line level.

The correcting the left road line level and the right road line level may include correcting the left road line level and the right road line level by determining whether a difference between a maximum value and a minimum value of the length of each of the left road line and the right road line is equal to or higher than a first threshold value.

The correcting the left road line level and the right road line level may include correcting the left road line level and the right road line level by determining whether an absolute value of a difference between the curvatures of each of the left road line and the right road line is equal to or higher than a second threshold value, and whether a value obtained by dividing the difference between the lengths of the left road line and the right road line by a maximum value of the lengths of the left road line and the right road line is less than or equal to a third threshold value.

The correcting the left road line level and the right road line level may include correcting the left road line level and the right road line level by determining whether an absolute value of a difference between the curvature changes of each of the left road line and the right road line is equal to or higher than a fourth threshold value, and whether a value obtained by dividing the difference between the lengths of the left road line and the right road line by a maximum value of the lengths of the left road line and the right road line is less than or equal to a fifth threshold value.

The correcting the left road line level and the right road line level may include correcting the left road line level and the right road line level by determining whether an immediate change of the recognized length of each of the left road line and the right road line is equal to or higher than a sixth threshold value.

The calculating the correction coefficient may be performed by calculating the correction coefficient (f) by dividing a difference between the corrected left road line level and the corrected right road line level by a greater value of the corrected left road line level and the corrected right road line level.

The correcting the road line information by the correction coefficient may include determining information about the road line with a lower level of the corrected left line level and the corrected right road line level as correction road line information ($I_a$), and by determining information about a road line with a higher level as use road line information ($I_b$), and by correcting the information (IL) about the road line with the lower level according to $$I_L = I_a * (1-f) + I_b * f.$$

In another general aspect, a system for compensating a road line includes: a sensor configured to sense and derive a length of a left road line and a length of a right road line; and a controller configured to determine a left road line level and a right road line level based on the length of the left road line and the length of the right road line, to correct the left road line level and the right road line level based on a change in the length of the left road line and the right road line or a change in curvatures of the left road line and the right road line, to calculate a correction coefficient based on the corrected left road line level and the corrected right road line level, and to correct, by the correction coefficient, information about a road line with a lower level of the left road line level and the right road line level to compensate the road line.

The controller may be configured to correct the left road line level and the right road line level by determining whether a difference between a maximum value and a minimum value of the length of each of the left road line and the right road line is equal to or higher than a first threshold value.

The controller may be configured to correct the left road line level and the right road line level by determining whether an absolute value of a difference between the curvatures of each of the left road line and the right road line is equal to or higher than a second threshold value, and by determining whether a value obtained by dividing a difference between the lengths of the left road line and the right road line by a maximum value of the lengths of the left road line and the right road line is less than or equal to a third threshold value.

The controller may be configured to calculate the correction coefficient (f) by dividing a difference between the corrected left road line level and the corrected right road line level by a greater value of the corrected left road line level and the corrected right road line level.

The controller may be configured to determine road line information about the road line with a lower level of the corrected left road line level and the corrected right road line level as correction road line information ($I_a$), and to determine road line information about a road line with a higher level as use road line information ($I_b$), and to correct the road line information (IL) about the road line with the lower level according to Other features and aspects will be apparent from the following detailed description, the drawings, and the claims.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE PREFERRED EMBODIMENTS

Hereinbelow, a preferred embodiment of the present invention for solving the above-described objective and problem will be described with reference to accompanying drawings. In the following description, if it is decided that the detailed description of known function or configuration related to the invention makes the subject matter of the invention unclear, the detailed description thereof is omitted. The spirit and scope of the present invention is not limited to a specific embodiment, and those skilled in the art will appreciate that the present invention can be embodied in many alternate forms.

Figure 4:
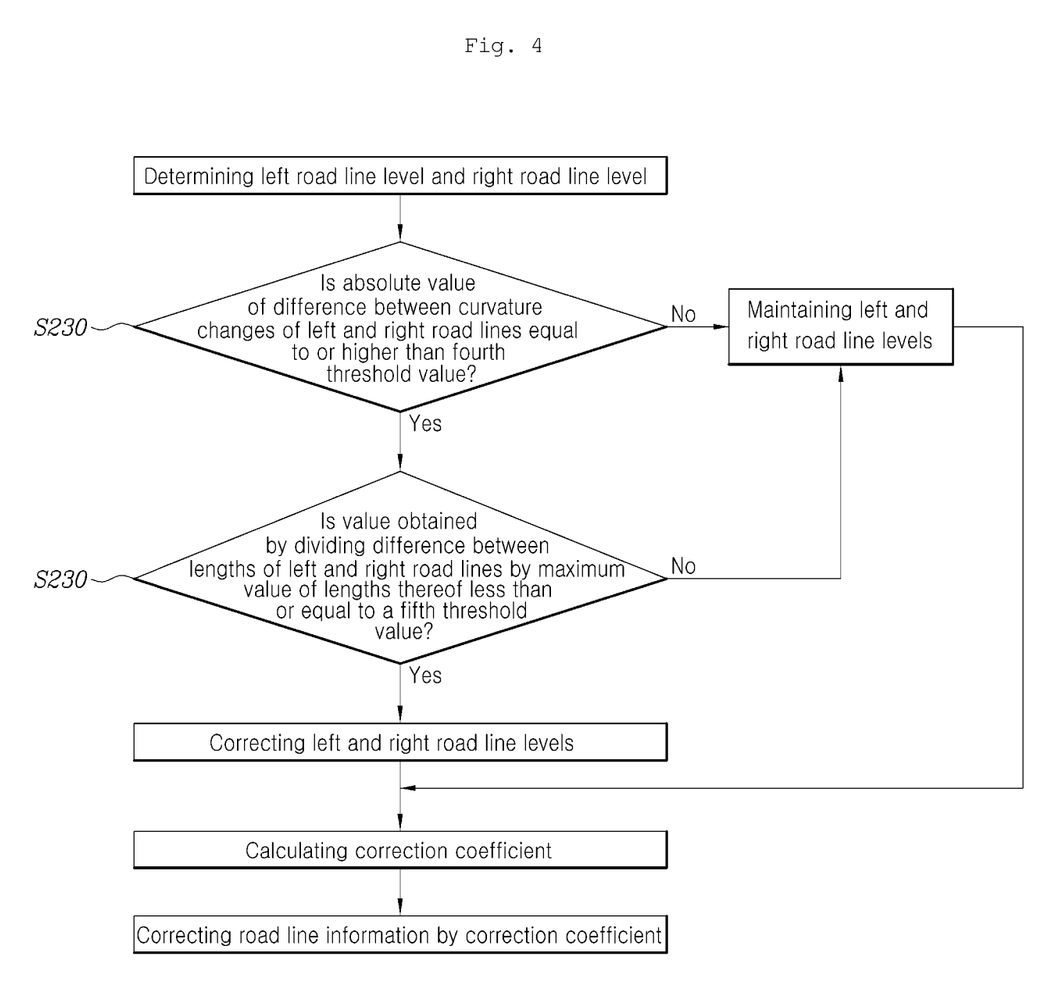
Figure 5:
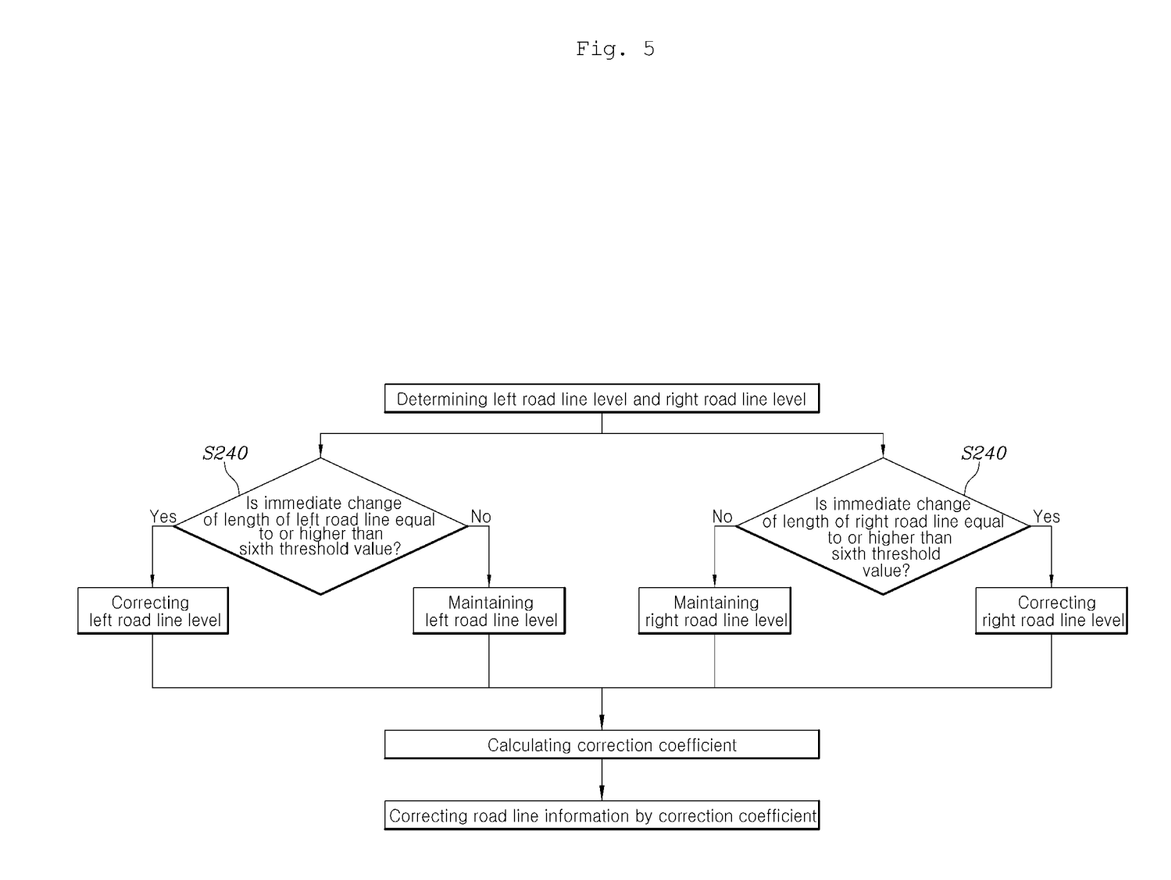
Figure 6:
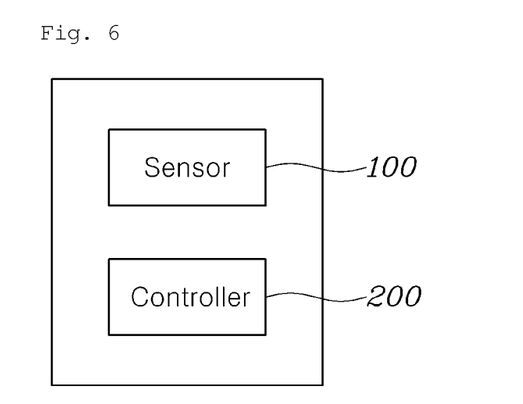
FIG. 6 is a block diagram showing a system for compensating a road line according to the embodiment of an embodiment of the present invention.

FIGS. 1 to 5 are flowcharts showing a method for compensating a road line according to a preferred embodiment of the present invention. FIG. 6 is a block diagram showing a system for compensating a road line according to an embodiment of the present invention.

Figure 1:
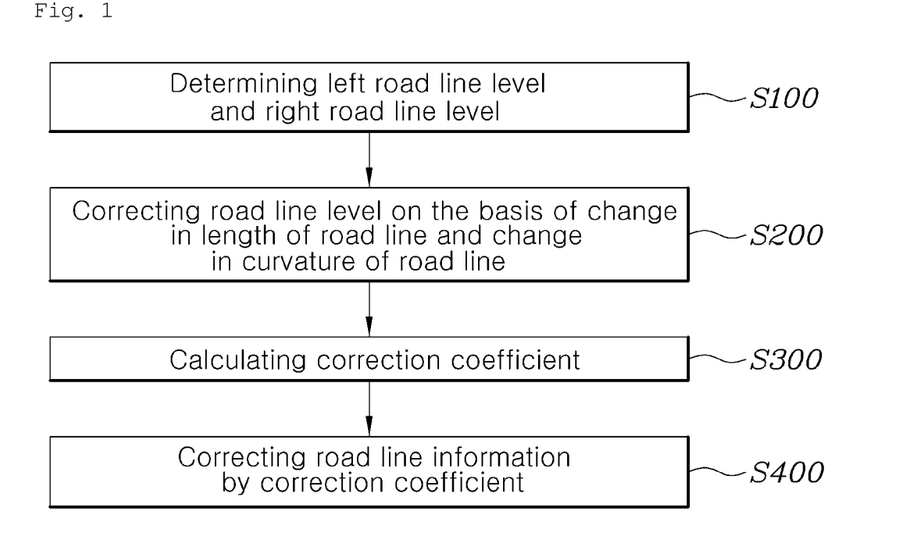
FIGS. 1 to 5 are flowcharts showing a method for compensating a road line according to an embodiment of the present invention.

In order to achieve the above objective, as shown in FIG. 1, the method for compensating a road line according to the present invention includes: deriving a length of a left road line and a length of a right road line, which are recognized by a sensor, and determining S100 a left road line level and a right road line level on the basis of the lengths thereof; correcting S200 the left road line level and the right road line level on the basis of a change in the length of each of the left and right road lines or a change in a curvature thereof; calculating S300 a correction coefficient on the basis of the corrected left and right road line levels; and correcting S400, by the correction coefficient, information about a road line with a lower level among the corrected left and right road line levels.

An autonomous vehicle collects information on roads using the sensor mounted to the vehicle and recognizes peripheral environment from the collected information to help a driver to drive safely.

Specifically, the road lines are important information for the vehicle to drive. The road lines help the vehicle to drive on the center between left and right road lines. The road lines may help the vehicle to drive while preventing the vehicle from being biased toward either of the left and right road lines. The road lines help the vehicle to drive in a smooth curve on a curved road.

However, the road lines may be erased by friction between vehicle's wheels and the road or may be misrecognized by the sensor. The misinformation may allow ADAS drive convenience and safety system to be malfunctioned, so vehicle driving may become unstable.

Therefore, when either of the information of the left and right road lines is uncertain, the vehicle may compensate information of the unstable road line using information of a relatively stable road line among the left and right road lines. In order to stably correct road line information, the deriving the lengths of the left and right road lines, which are recognized by the sensor mounted to the vehicle, is performed, and determining S100 the left road line level and the right road line level on the basis of the lengths thereof is performed.

Specifically, a road line level is determined on the basis of a length range of a road line that is recognized per unit time. The road line level range may vary from 1 to n, and the longer the road line, the higher the road line level. The road line level is gradually corrected and the corrected road line level is used in the compensation of the road line information. As an example, on the basis of the lengths of the left and right road lines, the left road line level may be determined as 3, and the right road line level may be determined as 5.

After the determining the road line, the vehicle performs the correcting S200 the left road line level and the right road line level on the basis of a change in the length of each of the left and right road lines or the change in the curvature thereof.

Specifically, the determined left and right road line levels may be lowered or maintained on the basis of the collected information about a change in the length of the road line or a change in the curvature thereof.

After the correcting the road line level, as the calculating S300 the correction coefficient on the basis of the corrected left and right road line levels, and the correcting S400, by the correction coefficient, the information about the road line with a lower level of the corrected left and right road line levels are performed, the information about the lower line level is compensated.

Figure 2:
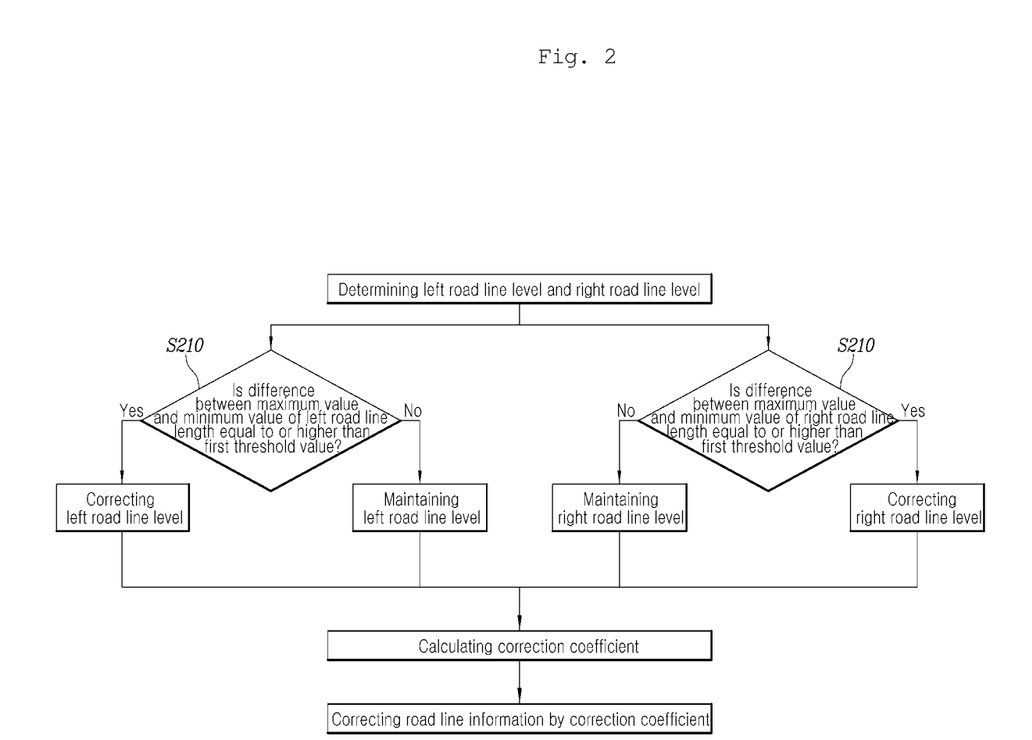

In detail, the correcting S200 the left road line level and the right road line level may be performed by correcting S210 the left road line level and the right road line level by determining whether a difference between the maximum value and a minimum value of the length of each of the left and right road lines is equal to or higher than a first threshold value.

Referring to FIG. 2, when the maximum value and the minimum value of the length of each of the left and right road line recognized per unit time are calculated and the difference between the values is equal to or higher than the first threshold value, it may be determined that the road line information is uncertain, so the road line level may be lowered. When the difference between the maximum value and the minimum value of the recognized left road line is equal to or higher than the first threshold value, and when the difference between the maximum value and the minimum value of the right road line that is recognized is less than the first threshold value, the left road line level is lowered by one level and the right road line level is maintained. For example, when the left road line level is determined as 3 and the right road line level is determined as 5 through the view range, through the correcting 210, the left road line level may be at 2 the right road line level may be at 5.

Figure 3:
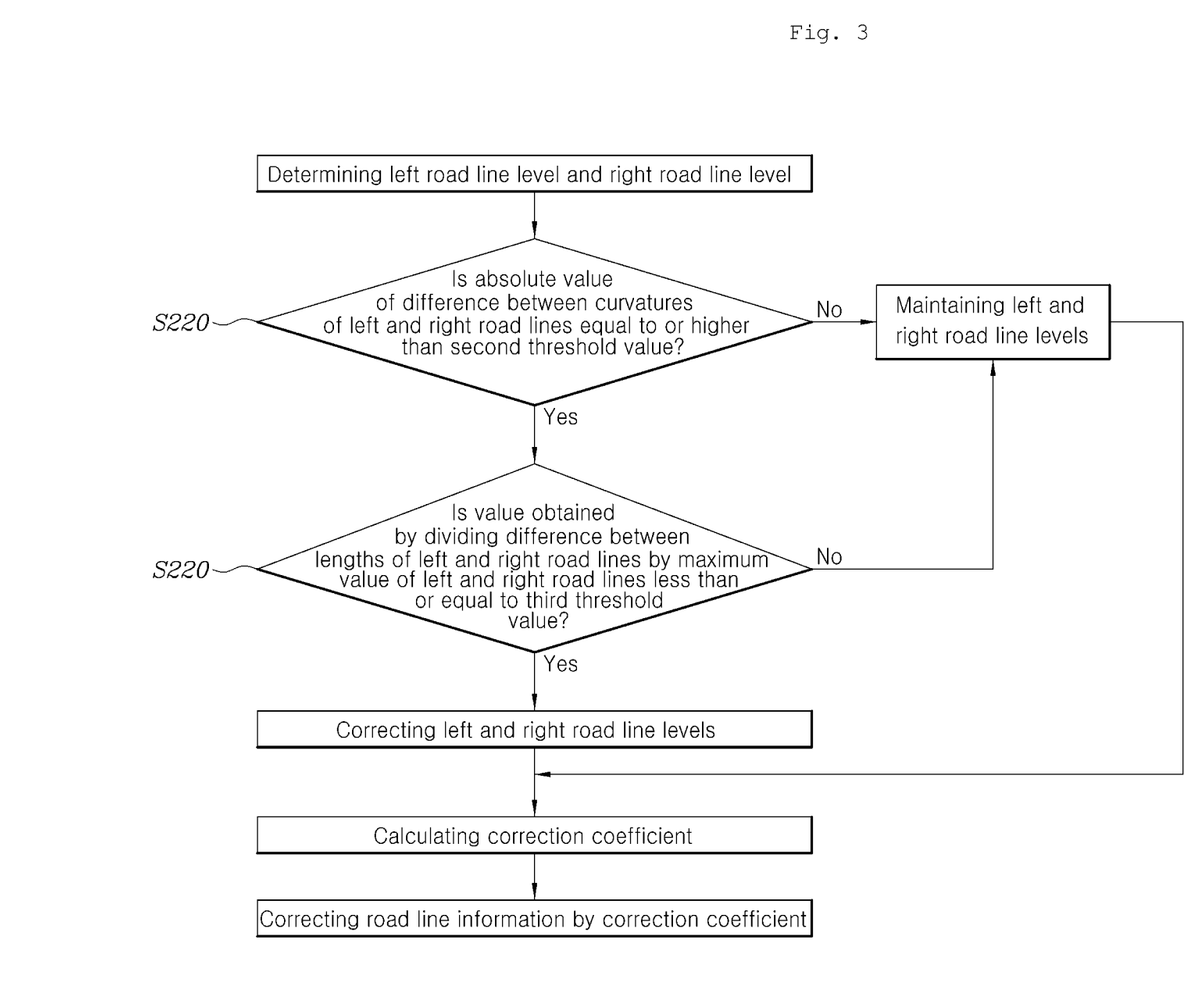

Moreover, the correcting S200 the left road line level and the right road line level may be performed by correcting S220 the left road line level and the right road line level by determining whether an absolute value of a difference between the curvatures of the left and right lanes is equal to or higher than a second threshold value and a value obtained by dividing a difference between the lengths of the left and right road lines by the maximum value of the left and right road lines is less than or equal to a third threshold value.

Referring to FIG. 3, the correcting S200 the left road line level and the right road line level is performed by correcting a vehicle level on the basis of the curvature information of the left and right road lines. After the curvatures of the left and right road lines are collected by the sensor, when the absolute value of the difference between the curvatures of the left and right road lines is equal to or higher than the second threshold value, and after the lengths of the sensed left and right road lines are measured, when the value obtained by dividing the difference between the lengths of the left and right road lines by the maximum value of the lengths thereof is less than or equal to the third threshold value, both the left and right road line levels may be lowered at the same time. When the difference between the left and right curvatures is equal to or higher than the second threshold value and the view ranges thereof is similar, it is determined that the road line information is unstable, so the left and right road line levels are lowered together.

When the left and right road line levels are lowered together, the weight factor of a road line information, which is determined as an effective road line, increases so that correction of a road line is possible.

The correcting S200 the left road line level and the right road line level may be performed by correcting S230 the left road line level and the right road line level by an absolute value of a difference between the curvature changes of the left and right road lines is equal to or higher than a fourth threshold value and a value obtained by dividing the difference between the lengths of the left and right road lines by the maximum value of the lengths thereof is less than or equal to a fifth threshold value.

Referring to FIG. 4, like collecting the curvatures, the curvature changes of the left and right road lines are also collected by the sensor. When the absolute value of the difference between the curvatures changes thereof is equal to or higher than the fourth threshold value, the lengths of the sensed left and right road lines are measured. When the value obtained by dividing the difference between the lengths thereof by the maximum value of the left and right road lines is less than or equal to the fifth threshold value, both the levels thereof may be lowered at the same time. When the difference between the curvature changes of the left and right road lines is equal to or higher than the fourth threshold value, and when the view ranges of the left and right road lines are similar, it is determined that road line information is unstable and the left and right road line levels are lowered together.

When the left and right road line levels are lowered together, the weight factor of a road line information, which is determined as an effective road line, increases, so that correction of a road line is possible.

The correcting S200 the left road line level and the right road line level may be performed by correcting S240 the left road line level and the right road line level by determining whether immediate changes in the lengths of the recognized left and right road lines are equal to or higher than a sixth threshold value.

Referring to FIG. 5, when the immediate changes in the lengths of the recognized road line rapidly increases or decreases equal to or higher than the sixth threshold value, it is determined that the road line information is unstable, so the road line level may be lowered.

Going through the above stages, the left road line level and the right road line level may be finally determined. On the basis of the determined left and right road line levels, the correction coefficient may be calculated.

The calculating S300 the correction coefficient may be calculating the correction coefficient (f) by dividing the difference between the corrected left road line level and the corrected right road line level by a greater value of the corrected left road line level and the corrected right road line level.

Through the correcting the left road line level and the right road line level, the left road line level is determined as (a) and the right road line level is determined as (b). When (b) is higher than (a) (b>a), the correction coefficient (f) may be calculated as follows.

$$f = \frac{|b - a|}{b}$$

The correcting S400 road line information through the correction coefficient may be performed by determining road line information about a road line with a lower level of the corrected left road line level and the corrected right road line level as correction road line information ($I_a$)) determining road line information about a road line with a higher level thereof as use road line information ($I_b$), and correcting the road line information ($I_L$) with lower level according to following Equation 1.

$$I_L = I_a * (1-f) + I_b * f \qquad \text{[Equation 1]}$$

Going through the above stages, the road line information such as a length, curvature, curvature change of a road line to be corrected may be compensated, whereby ADAS safety features can be improved by continuously correcting the road line information.

FIG. 6 is a block diagram showing a system for compensating a road line according to an embodiment of the present invention. Referring to FIG. 6, the system for compensating a road line may include: a sensor 100 sensing and deriving the length of the left road line and the length of the right road line; and a controller 200 determining the left road line level and the right road line level on the basis of the derived lengths, correcting the left road line level and the right road line level on the basis of a change in the lengths of the left and right road lines and a change in curvatures thereof, calculating the correction coefficient on the basis of the corrected left road line level and the corrected right road line level, compensating a road line by correcting, by the correction coefficient, the information about the road line with the lower level of the corrected left road line level and the corrected right road line level.

The controller may determine whether a difference between the maximum value and the minimum value of the lengths of the left and right road lines is equal to or higher than the first threshold value, and thus correct the left road line level and the right road line level.

The controller determines whether the absolute value of the difference between the curvatures of the left and right road lines is equal to or higher than the second threshold value, and whether a value obtained by dividing the difference between the lengths of the left and right road lines by the maximum value of the lengths of the left and right road lines is less than or equal to the third threshold value. Accordingly, the controller may correct the left road line level and the right road line level.

The controller may calculate the correction coefficient (f) by dividing the difference between the corrected left road line level and the corrected right road line level by the greater value of the corrected left road line level and the corrected right road line level.

The controller determines the information about a road line with the lower level of the corrected left road line level and the corrected right road line level as the correction road line information ($I_a$), determines the information about a road line with a higher level thereof as the use road line information ($I_b$), and corrects the information ($I_L$) of the road line with the lower level according to Equation 1.

$$I_L = I_a*(1-f) + I_b*f. \quad \text{[Equation 1]}$$

With the system described above, road line information can be continuously corrected in calculating a target trajectory during driving of the vehicle, a relatively effective road line and a relatively ineffective road line are determined in the left and right road lines, and the information of the relatively ineffective road line is corrected on the basis of the information of the effective road line, whereby stable driving is possible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for compensating a road line, the method comprising:
   deriving, by a sensor, a length of a left road line and a length of a right road line, which are recognized by the sensor;
   determining, by a controller, a left road line level and a right road line level based on the length of the left road line and the length of the right road line, each road line level ranging from 1 to n, n being greater than 1;
   correcting, by the controller, the left road line level and the right road line level based on a change in the lengths of the left road line and the right road line or a change in curvatures of the left road line and the right road line;
   calculating, by the controller, a correction coefficient based on the corrected left road line level and the corrected right road line level; and
   correcting, by the correction coefficient, information about the road line with a lower level of the corrected left road line level and the corrected right road line level to compensate the road line.

2. The method of claim 1, wherein the correcting of the left road line level and the right road line level comprises:
   determining whether a difference between a maximum value and a minimum value of the length of each of the left road line and the right road line is equal to or higher than a first threshold value;
   lowering the left road line level by one level when the difference between the maximum value and the minimum value of the length of the left road line is equal to or higher than the first threshold value; and
   maintaining the right road line level when the difference between the maximum value and the minimum value of the length of the right road line is less than the first threshold value.

3. The method of claim 1, wherein the correcting of the left road line level and the right road line level comprises:
   determining whether an absolute value of a difference between the curvatures of each of the left road line and the right road line is equal to or higher than a second threshold value, and whether a value obtained by dividing a difference between the lengths of the left road line and the right road line by a maximum value of the lengths of the left road line and the right road line is less than or equal to a third threshold value; and
   lowering the left and right road line levels together when the absolute value of the difference between the curvatures is equal to or higher than the second threshold value and when the value obtained by dividing the difference between the lengths of the left and right road lines by the maximum value of the lengths of the left and right road lines is less than or equal to the third threshold value.

4. The method of claim 1, wherein the correcting of the left road line level and the right road line level comprises:
   determining whether an absolute value of a difference between curvature changes of each of the left road line and the right road line is equal to or higher than a fourth threshold value, and whether a value obtained by dividing the difference between the lengths of the left road line and the right road line by a maximum value of the lengths of the left road line and the right road line is less than or equal to a fifth threshold value; and
   lowering the left and right road line levels together when the absolute value of the difference between the curvature changes is equal to or higher than the fourth threshold value, and when the value obtained by dividing the difference between the lengths of the left and right road lines by a maximum value of the lengths of the left and right road lines is less than or equal to the fifth threshold value.

5. The method of claim 1, wherein the correcting of the left road line level and the right road line level comprises:
   determining whether an immediate change of the recognized length of each of the left road line and the right road line is equal to or higher than a sixth threshold value; and
   lowering the left and right road line levels when the immediate change of the recognized length of each of the left and right road lines is equal to or higher than the sixth threshold value.

6. The method of claim 1, wherein the calculating of the correction coefficient (f) comprises:
   dividing a difference between the corrected left road line level (a) and the corrected right road line level (b) by a greater value of the corrected left road line level and the corrected right road line level, wherein when (b) is greater than (a), the correction coefficient (f) is calculated as follows:

$$f = \frac{|b-a|}{b}.$$

7. The method of claim 6, wherein the correcting of the information of the road line by the correction coefficient comprises:
   determining the information about the road line with the lower level of the corrected left line level and the corrected right road line level as correction road line information ($I_a$);
   determining information about the road line with a higher level as use road line information ($I_b$); and
   correcting the information ($I_L$) about the road line with the lower level according to $I_L = I_a*(1-f)+I_b*f$.

8. A system for compensating a road line, the system comprising:
   a sensor configured to sense and derive a length of a left road line and a length of a right road line; and
   a controller configured to:
      determine a left road line level and a right road line level based on the length of the left road line and the length of the right road line, each road line level ranging from 1 to n, n being greater than 1;
      correct the left road line level and the right road line level based on a change in the length of the left road line and the right road line or a change in curvatures of the left road line and the right road line;
      calculate a correction coefficient based on the corrected left road line level and the corrected right road line level; and
      correct, by the correction coefficient, information about the road line with a lower level of the left road line level and the right road line level to compensate the road line.

9. The system of claim 8, wherein the controller is configured to:
   determine whether a difference between a maximum value and a minimum value of the length of each of the left road line and the right road line is equal to or higher than a first threshold value;
   lower the left road line level by one level when the difference between the maximum value and the minimum value of the length of the left road line is equal to or higher than the first threshold value; and
   maintain the right road line level when the difference between the maximum value and the minimum value of the length of the right road line is less than the first threshold value.

10. The system of claim 8, wherein the controller is configured to:
    determine whether an absolute value of a difference between the curvatures of each of the left road line and the right road line is equal to or higher than a second threshold value, and whether a value obtained by dividing a difference between the lengths of the left road line and the right road line by a maximum value of the lengths of the left road line and the right road line is less than or equal to a third threshold value; and
    lower the left and right road line levels together when the absolute value of the difference between the curvatures is equal to or higher than the second threshold value and when the value obtained by dividing the difference between the lengths of the left and right road lines by the maximum value of the lengths of the left and right road lines is less than or equal to the third threshold value.

11. The system of claim 8, wherein the controller is configured to:
    divide a difference between the corrected left road line level (a) and the corrected right road line level (b) by a greater value of the corrected left road line level and the corrected right road line level,
    wherein when (b) is greater than (a), the correction coefficient (f) is calculated as follows:

$$f = \frac{|b-a|}{b}.$$

12. The system of claim 11, wherein the controller is configured to:
    determine the information about the road line with the lower level of the corrected left road line level and the corrected right road line level as correction road line information ($I_a$);
    determine information about the road line with a higher level as use road line information ($I_b$); and
    correct the information ($I_L$) about the road line with the lower level according to $I_L = I_a*(1-f)+I_b*f$.

* * * * *